United States Patent
Taniguchi et al.

(10) Patent No.: US 8,264,114 B2
(45) Date of Patent: Sep. 11, 2012

(54) ELECTRIC ROTATING MACHINE HAVING IMPROVED STATOR COIL ARRANGEMENT FOR REDUCING MAGNETIC NOISE AND TORQUE RIPPLE

(75) Inventors: Makoto Taniguchi, Oobu (JP); Asuka Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 223 days.

(21) Appl. No.: 12/780,125

(22) Filed: May 14, 2010

(65) Prior Publication Data
US 2010/0289372 A1 Nov. 18, 2010

(30) Foreign Application Priority Data
May 14, 2009 (JP) ................... 2009-117784

(51) Int. Cl.
 *H02K 19/00* (2006.01)
 *H02K 19/10* (2006.01)
 *H02K 19/12* (2006.01)
(52) U.S. Cl. ........................ 310/184; 310/180
(58) Field of Classification Search .................. 310/180, 310/184, 195, 208
See application file for complete search history.

(56) References Cited

U.S. PATENT DOCUMENTS

| | | | | |
|---|---|---|---|---|
| 5,019,766 A * | 5/1991 | Hsu et al. | ....................... | 318/807 |
| 5,212,629 A * | 5/1993 | Jessee | ............................. | 363/42 |
| 5,965,965 A | 10/1999 | Umeda et al. | | |
| 6,335,582 B1 * | 1/2002 | Abukawa et al. | .............. | 310/214 |
| 6,630,804 B2 * | 10/2003 | Moriya et al. | ................... | 318/85 |
| 7,439,697 B2 * | 10/2008 | Miyazaki et al. | ........ | 318/400.41 |
| 2008/0278102 A1 | 11/2008 | Taniguchi | | |

FOREIGN PATENT DOCUMENTS

| | | | |
|---|---|---|---|
| JP | 64-055076 A | * | 3/1989 |
| JP | 04-026345 | | 1/1992 |
| JP | 04-251537 | | 9/1992 |
| JP | 11-075334 | | 3/1999 |
| JP | 11-98791 | * | 4/1999 |
| JP | 2008-005603 | | 1/2008 |
| JP | 2008-306914 | | 12/2008 |

OTHER PUBLICATIONS

Machine Translation, Inoue, JP-2008-005603, Jan. 2008.*

* cited by examiner

*Primary Examiner* — Burton Mullins
(74) *Attorney, Agent, or Firm* — Nixon & Vanderhye PC (57) ABSTRACT

An electric rotating machine is disclosed which includes a stator and a rotor. The stator includes a hollow cylindrical stator core and first and second three-phase stator coils. The stator core has a plurality of stator core teeth formed at a predetermined pitch in a circumferential direction of the stator core. Each of the first and second three-phase stator coils is comprised of three phase windings. Each of the phase windings of the first and second three-phase stator coils is wound around each of a predetermined number of the stator core teeth by a predetermined number of turns. The rotor has a plurality of magnetic poles the polarities of which alternate between north and south in the circumferential direction of the stator core. Further, the first and second three-phase stator coils are offset in the circumferential direction of the stator core to have a phase difference of $\pi/6$ therebetween.

6 Claims, 5 Drawing Sheets

ELECTRICAL ANGLE (°)

ELECTRIC ROTATING MACHINE HAVING IMPROVED STATOR COIL ARRANGEMENT FOR REDUCING MAGNETIC NOISE AND TORQUE RIPPLE

CROSS-REFERENCE TO RELATED APPLICATION

This application is based on and claims priority from Japanese Patent Application No. 2009-117784, filed on May 14, 2009, the content of which is hereby incorporated by reference in its entirety into this application.

BACKGROUND OF THE INVENTION

1. Technical Field of the Invention

The present invention relates generally to electric rotating machines that include a plurality of multi-phase stator coils. More particularly, the invention relates to an electric rotating machine that has an improved arrangement of two three-phase stator coils for reducing magnetic noise and torque ripple.

2. Description of the Related Art

A conventional three-phase electric rotating machine includes a stator and a rotor. The stator includes a hollow cylindrical stator core and a three-phase stator coil wound around the stator core. The rotor has a plurality of magnetic poles that are formed with permanent magnets and are so arranged that the polarities of the magnetic poles alternate between north and south in the circumferential direction of the stator core. In such an electric rotating machine, magnetic noise and torque ripple are generally caused by the overlapping of harmonic components with sine-wave drive currents supplied to the phase windings of the three-phase stator coil. More specifically, the magnetic noise and torque ripple are mainly caused by the sixth-order harmonic components of the sine-wave drive currents. In addition, the wavelength of the sixth-order harmonic components is equal to $\pi/3$.

Japanese Unexamined Patent Application Publication No. H4-26345 discloses an automotive alternator that can reduce the magnetic noise and torque ripple caused by the sixth-order harmonic components. More specifically, the stator of the alternator includes a first three-phase stator coil and a second three-phase stator coil. Each of the first and second three-phase stator coils is comprised of three phase windings. Moreover, the first and second three-phase stator coils are wound on the stator core so that each of the phase windings of the first three-phase stator coil is offset by an electrical angle of $\pi/6$ from a corresponding one of the phase windings of the second three-phase stator coil. That is, a phase difference of $\pi/6$ is provided between the corresponding pairs of the phase windings of the first and second three-phase stator coils. Since the phase difference of $\pi/6$ is equal to half the wavelength (i.e., $\pi/3$) of the sixth-order harmonics components, the magnetic noise and torque ripple caused by the sixth-order harmonic components of sine-wave drive currents supplied to the phase windings of the first three-phase stator coil can be offset by those caused by the same of sine-wave drive currents supplied to the phase windings of the second three-phase stator coil. Consequently, the total magnetic noise and torque ripple generated in the automotive alternator can be reduced.

Figure 12A:
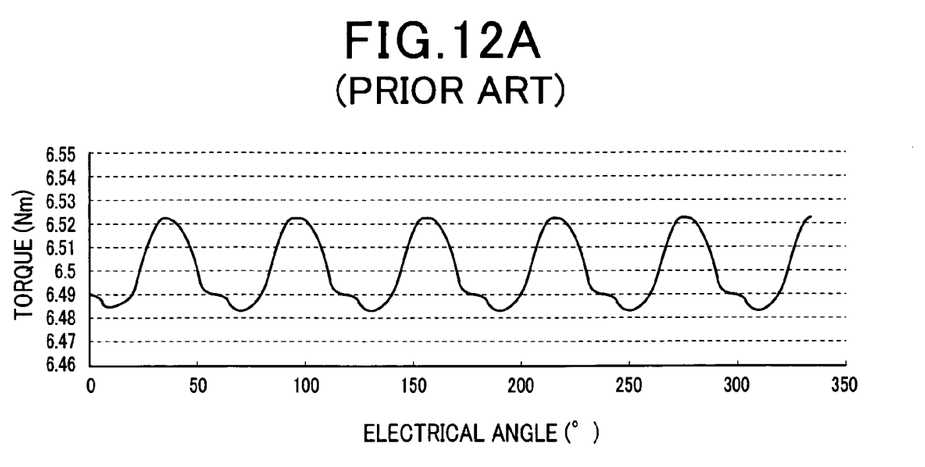
FIGS. 12A and 12B are waveform charts illustrating prior art.
Figure 12B:
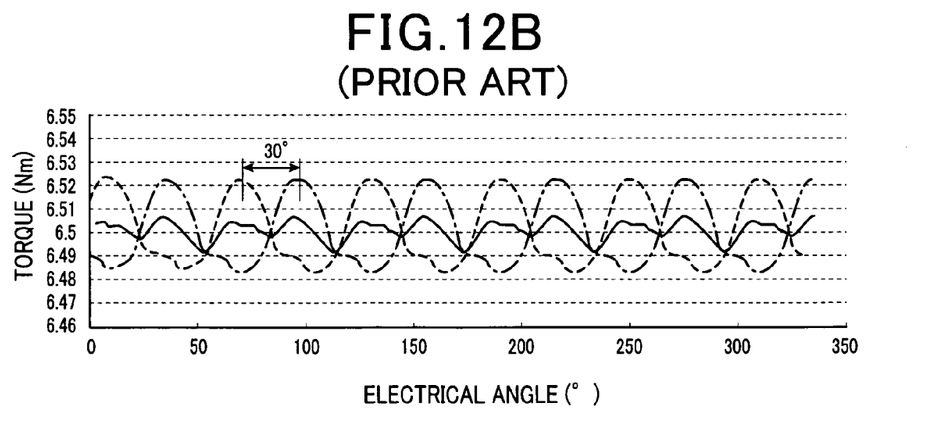

FIG. 12A illustrates the torque ripple generated in the conventional electric rotating machine, and FIG. 12B illustrates the total torque ripple generated in the automotive alternator disclosed in the above patent document. It can be seen from FIGS. 12A and 12B that with the phase difference of $\pi/6$ provided between the first and second three-phase stator coils, the total torque ripple generated in the automotive alternator is considerably reduced in comparison with the torque ripple generated in the conventional electric rotating machine.

However, in the automotive alternator disclosed in the above patent document, the first and second three-phase stator coils are wound in a distributed winding manner so that each of the phase windings of the first and second three-phase stator coils is wound across a plurality of stator core teeth. Consequently, it is difficult to suitably arrange the coil ends of the first and second three-phase stator coils (i.e., the axial end portions of the stator coils protruding from the axial end faces of the stator core). As a result, it is difficult to minimize the size of the electric rotating machine.

SUMMARY OF THE INVENTION

According to the present invention, there is provided an electric rotating machine which includes a stator and a rotor. The stator includes a hollow cylindrical stator core and first and second three-phase stator coils. The stator core has a plurality of stator core teeth that are formed at a predetermined pitch in a circumferential direction of the stator core. Each of the first and second three-phase stator coils is comprised of three phase windings. The first and second three-phase stator coils are wound on the stator core in a concentrated winding manner so that each of the phase windings of the first and second three-phase stator coils is wound around each of a predetermined number of the stator core teeth by a predetermined number of turns. The rotor is disposed radially inside of the stator core. The rotor has a plurality of magnetic poles which are so formed that the polarities of the magnetic poles alternate between north and south in the circumferential direction of the stator core. Further, in the electric rotating machine, the first and second three-phase stator coils are offset in the circumferential direction of the stator core to have a phase difference of $\pi/6$ therebetween.

With the above configuration, since the first and second three-phase stator coils are wound in the concentrated winding manner, it is possible to suitably arrange the coil ends of the first and second three-phase stator coils and thereby minimize the size of the electric rotating machine. Moreover, with the phase difference of $\pi/6$ provided between the first and second three-phase stator coils, the magnetic noise and torque ripple caused by the sixth-order harmonic components of drive currents supplied to the phase windings of the first stator coil can be offset by those caused by the same of drive currents supplied to the phase windings of the second stator coil. Consequently, the total magnetic noise and torque ripple generated in the rotating electric machine can be reduced.

Preferably, in the electric rotating machine, with respect to the pitch of the magnetic poles in electrical angle being equal to $\pi$, the pitch of the stator core teeth in electrical angle is equal to $(1\pm1/6)\pi$. The winding directions of each corresponding pair of one of the phase windings of the first three-phase stator coil and one of the phase windings of the second three-phase stator coil, which are respectively wound around an adjacent pair of the stator core teeth, are opposite to each other.

Further, preferably, the number of the stator core teeth is equal to $12\times n$, where n is a natural number; the ratio of the number of the stator core teeth to the number of the magnetic poles is equal to 6:5 or 6:7.

The three phase windings of the first three-phase stator coil may be a U-phase winding, a W-phase winding, and a V-phase winding. The three phase windings of the second three-phase stator coil may be an X-phase winding, a Y-phase winding, and a Z-phase winding.

Further, the U-phase winding may include first and second sections that are wound respectively around the $(12\times(n-1)+1)$th and $(12\times(n-1)+7)$th stator core teeth and connected in series or parallel with each other. The V-phase winding may include first and second sections that are wound respectively around the $(12\times(n-1)+3)$th and $(12\times(n-1)+9)$th stator core teeth and connected in series or parallel with each other. The W-phase winding may include first and second sections that are wound respectively around the $(12\times(n-1)+5)$th and $(12\times(n-1)+11)$th stator core teeth and connected in series or parallel with each other. The X-phase winding may include first and second sections that are wound respectively around the $(12\times(n-1)+2)$th and $(12\times(n-1)+8)$th stator core teeth and connected in series or parallel with each other. The Y-phase winding may include first and second sections that are wound respectively around the $(12\times(n-1)+4)$th and $(12\times(n-1)+10)$th stator core teeth and connected in series or parallel with each other. The Z-phase winding may include first and second sections that are wound respectively around the $(12\times(n-1)+6)$th and $(12\times(n-1)+12)$th stator core teeth and connected in series or parallel with each other.

Otherwise, the U-phase winding may include first, second, third, and fourth sections that are wound respectively around the $(12\times(n-1)+1)$th, $(12\times(n-1)+2)$th, $(12\times(n-1)+7)$th, and $(12\times(n-1)+8)$th stator core teeth and connected in series or parallel with each other. The V-phase winding may include first, second, third, and fourth sections that are wound respectively around the $(12\times(n-1)+3)$th, $(12\times(n-1)+4)$th, $(12\times(n-1)+9)$th, and $(12\times(n-1)+10)$th stator core teeth and connected in series or parallel with each other. The W-phase winding may include first, second, third, and fourth sections that are wound respectively around the $(12\times(n-1)+5)$th, $(12\times(n-1)+6)$th, $(12\times(n-1)+11)$th, and $(12\times(n-1)+12)$th stator core teeth and connected in series or parallel with each other. The X-phase winding may include first, second, third, and fourth sections that are wound respectively around the $(12\times(n-1)+7)$th, $(12\times(n-1)+6)$th, $(12\times(n-1)+1)$th, and $(12\times(n-1)+12)$th stator core teeth and connected in series or parallel with each other. The Y-phase winding may include first, second, third, and fourth sections that are wound respectively around the $(12\times(n-1)+9)$th, $(12\times(n-1)+8)$th, $(12\times(n-1)+3)$th, and $(12\times(n-1)\pm2)$th stator core teeth and connected in series or parallel with each other. The Z-phase winding may include first, second, third, and fourth sections that are wound respectively around the $(12\times(n-1)+11)$th, $(12\times(n-1)+10)$th, $(12\times(n-1)+5)$th, and $(12\times(n-1)+4)$th stator core teeth and connected in series or parallel with each other. The electric rotating machine may be used in a mechanical power generating system which further includes a first inverter and a second inverter. The first inverter may drive the first three-phase stator coil by supplying first drive currents to the phase windings of the first three-phase stator coil. The second inverter may drive the second three-phase stator coil by supplying second drive currents to the phase windings of the second three-phase stator coil. In this case, it is preferable that a phase difference of $\pi/6$ be provided between each corresponding pair of one of the first drive currents and one of the second drive currents which are respectively supplied to a corresponding pair of one of the phase windings of the first three-phase stator coil and one of the phase windings of the second three-phase stator coil.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Preferred embodiments of the present invention will be described hereinafter with reference to FIGS. 1-11. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated below.

[First Embodiment]

Figure 1:
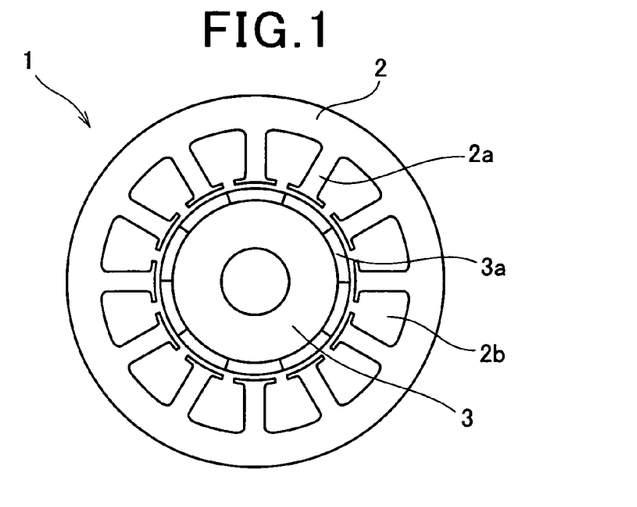
FIG. 1 is a schematic view showing the overall configuration of an electric rotating machine according to the first embodiment of the invention.

FIG. 1 shows the overall configuration of an electric rotating machine 1 according to the first embodiment of the invention. In the present embodiment, the electric rotating machine 1 is designed to function as an electric motor in a motor vehicle. As shown in FIG. 1, the electric rotating machine 1 includes a stator 2 and a rotor 3.

Figure 2:
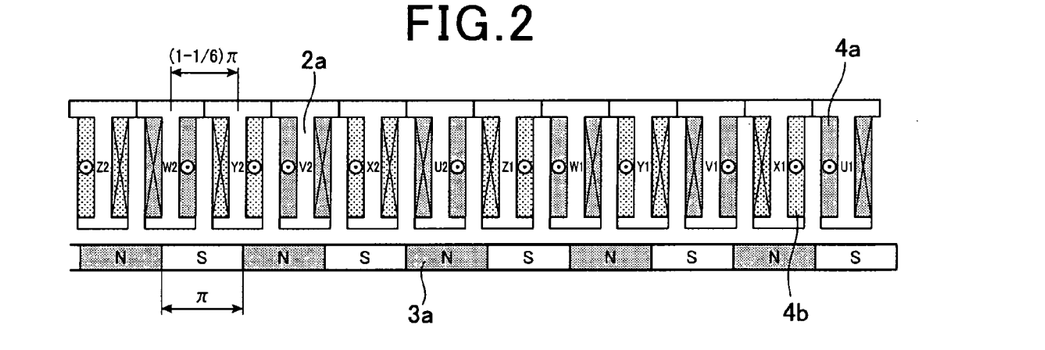
FIG. 2 is a development of an axial cross section of the electric rotating machine according to the first embodiment.

Referring further to FIG. 2 together with FIG. 1, the stator 2 includes a hollow cylindrical stator core and first and second three-phase stator coils 4a and 4b. The stator core has formed therein twelve stator core teeth 2a that protrude radially inward and are arranged in the circumferential direction of the stator core at a predetermined pitch. Between each circumferentially-adjacent pair of the stator core teeth 2a, there is formed a slot 2b. In other words, the stator core includes twelve slots 2b formed between the stator core teeth 2a.

The rotor 3 is rotatably disposed radially inside of the stator core 2. The rotor 3 has ten magnetic poles 3a that are formed, for example by permanent magnets, on a radially outer periphery of the rotor 3 to face a radially inner periphery of the stator 2. Further, the ten magnetic poles 3a include five N (North) poles and five S (South) poles that are alternately arranged in the circumferential direction of the rotor 3 (or in the circumferential direction of the stator core).

In the present embodiment, as described above, with respect to the number of the stator core teeth 2a being equal to twelve, the number of the magnetic poles 3a is equal to ten. Therefore, with respect to the pitch of the magnetic poles 3a in electrical angle being equal to $\pi$, the pitch of the stator core teeth 2a in electrical angle is equal to $(1-1/6)\pi$.

Figure 3:
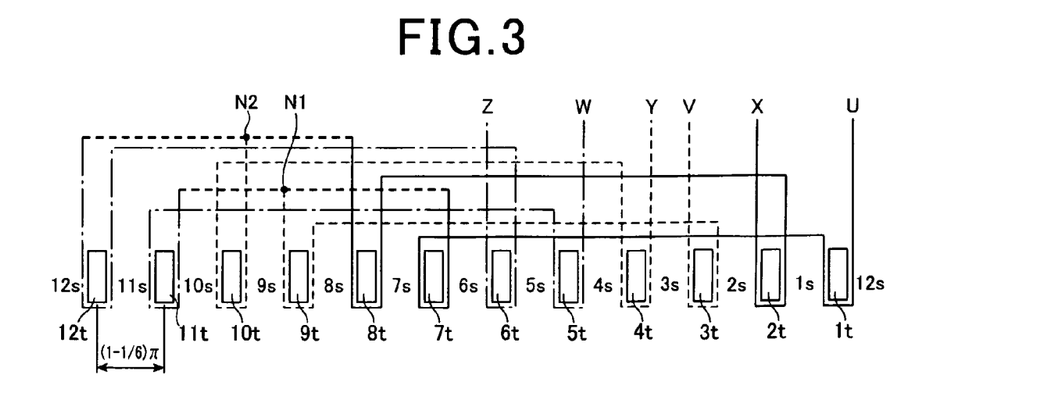
FIG. 3 is a schematic circuit diagram of the electric rotating machine according to the first embodiment.

Referring now to FIG. 3, the first three-phase stator coil 4a is comprised of a U-phase winding, a V-phase winding, a W-phase winding. On the other hand, the second three-phase stator coil 4b is comprised of an X-phase, a Y-phase, and a W-phase winding. In addition, for the sake of convenience of explanation, in FIG. 3, the twelve stator core teeth 2a of the stator core are sequentially numbered with numerals 1t-12t; the twelve slots 2b of the stator core are sequentially numbered with numerals 1s-12s.

In the present embodiment, the first three-phase stator coil 4a is wound in a concentrated winding manner so that each of the U-phase, V-phase, and W-phase windings is wound around each of corresponding two of the stator core teeth 2a of the stator core by a predetermined number of turns.

Specifically, the U-phase winding includes first and second sections U1 and U2. The first section U1 is wound, from the slot 12s to the slot 1s, clockwise around the stator core tooth 1t by the predetermined number of turns. The second section U2 is wound, from the slot 7s to the slot 6s, counterclockwise around the stator core tooth 7t by the predetermined number of turns. Further, the first and second sections U1 and U2 of the U-phase winding are connected in series with each other. More specifically, one end of the first section U1 which protrudes from the slot 12s makes up a U-terminal of the first stator coil 4a; the other end of the first section U1 which protrudes from the slot 1s is connected to one end of the second section U2 which protrudes from the slot 7s; and the other end of the second section U2 which protrudes from the slot 6s is connected to a neutral point N1 of the first stator coil 4a.

The V-phase winding includes first and second sections V1 and V2. The first section V1 is wound, from the slot 3s to the slot 2s, counterclockwise around the stator core tooth 3t by the predetermined number of turns. The second section V2 is wound, from the slot 8s to the slot 9s, clockwise around the stator core tooth 9t by the predetermined number of turns. Further, the first and second sections V1 and V2 of the V-phase winding are connected in series with each other. More specifically, one end of the first section V1 which protrudes from the slot 3s makes up a V-terminal of the first stator coil 4a; the other end of the first section V1 which protrudes from the slot 2s is connected to one end of the second section V2 which protrudes from the slot 8s; and the other end of the second section V2 which protrudes from the slot 9s is connected to the neutral point N1 of the first stator coil 4a.

The W-phase winding includes first and second sections W1 and W2. The first section W1 is wound, from the slot 4s to the slot 5s, clockwise around the stator core tooth 5t by the predetermined number of turns. The second section W2 is wound, from the slot 11s to the slot 10s, counterclockwise around the stator core tooth 11t by the predetermined number of turns. Further, the first and second sections W1 and W2 of the W-phase winding are connected in series with each other.

More specifically, one end of the first section W1 which protrudes from the slot 4s makes up a W-terminal of the first stator coil 4a; the other end of the first section W1 which protrudes from the slot 5s is connected to one end of the second section W2 which protrudes from the slot 11s; and the other end of the second section W2 which protrudes from the slot 10s is connected to the neutral point N1 of the first stator coil 4a.

The second three-phase stator coil 4b is also wound in the concentrated winding manner so that each of the X-phase, Y-phase, and Z-phase windings is wound around each of corresponding two of the stator core teeth 2a of the stator core by the predetermined number of turns.

Specifically, the X-phase winding includes first and second sections X1 and X2. The first section X1 is wound, from the slot 2s to the slot 1s, counterclockwise around the stator core tooth 2t by the predetermined number of turns. The second section X2 is wound, from the slot 7s to the slot 8s, clockwise around the stator core tooth 8t by the predetermined number of turns. Further, the first and second sections X1 and X2 of the X-phase winding are connected in series with each other. More specifically, one end of the first section X1 which protrudes from the slot 2s makes up a X-terminal of the second stator coil 4b; the other end of the first section X1 which protrudes from the slot 1s is connected to one end of the second section X2 which protrudes from the slot 7s; and the other end of the second section X2 which protrudes from the slot 8s is connected to a neutral point N2 of the second stator coil 4b.

The Y-phase winding includes first and second sections Y1 and Y2. The first section Y1 is wound, from the slot 3s to the slot 4s, clockwise around the stator core tooth 4t by the predetermined number of turns. The second section Y2 is wound, from the slot 10s to the slot 9s, counterclockwise around the stator core tooth 10t by the predetermined number of turns. Further, the first and second sections Y1 and Y2 of the Y-phase winding are connected in series with each other. More specifically, one end of the first section Y1 which protrudes from the slot 3s makes up a Y-terminal of the second stator coil 4b; the other end of the first section Y1 which protrudes from the slot 4s is connected to one end of the second section Y2 which protrudes from the slot 10s; and the other end of the second section Y2 which protrudes from the slot 9s is connected to the neutral point N2 of the second stator coil 4b.

The Z-phase winding includes first and second sections Z1 and Z2. The first section Z1 is wound, from the slot 6s to the slot 5s, counterclockwise around the stator core tooth 6t by the predetermined number of turns. The second section Z2 is wound, from the slot 11s to the slot 12s, clockwise around the stator core tooth 12t by the predetermined number of turns. Further, the first and second sections Z1 and Z2 of the Z-phase winding are connected in series with each other. More specifically, one end of the first section Z1 which protrudes from the slot 6s makes up a Z-terminal of the second stator coil 4b; the other end of the first section Z1 which protrudes from the slot 5s is connected to one end of the second section Z2 which protrudes from the slot 11s; and the other end of the second section Z2 which protrudes from the slot 12s is connected to the neutral point N2 of the second stator coil 4b.

As above, in the present embodiment, the U-phase, V-phase, and W-phase windings of the first stator coil 4a are wound around the odd-numbered stator core teeth 2a, whereas the X-phase, Y-phase, and Z-phase windings of the second stator coil 4b are wound around the even-numbered stator core teeth 2a. That is, the U-phase, V-phase, and W-phase windings of the first stator coil 4a are alternately assigned to the stator core teeth 2a with the X-phase, Y-phase, and Z-phase windings of the second stator coil 4b. Moreover, the pitch of the stator core teeth 2a in electrical angle is equal to $(1-1/6)\pi$. Further, the winding directions of each corresponding pair of one of the U-phase, V-phase, and W-phase windings of the first stator coil 4a and one of the X-phase, Y-phase, and Z-phase windings of the second stator coil 4b, which are respectively wound around an adjacent pair of the stator core teeth 2a, are opposite to each other. Consequently, the phase difference between each corresponding pair of the phase windings of the first and second stator coils 4a and 4b, such as the pair of U-phase and X-phase windings, the pair of V-phase and Y-phase windings, and the pair of W-phase and Z-phase windings, becomes equal to $(1-1/6)\pi-\pi=-\pi/6$. As a result, the first and second three-phase stator coils 4a and 4b are offset from each other in the circumferential direction of the stator core to have a phase difference of $\pi/6$ therebetween. In other words, the first and second three-phase stator coils 4a and 4b are offset by an electrical angle of $\pi/6$.

Figure 4:
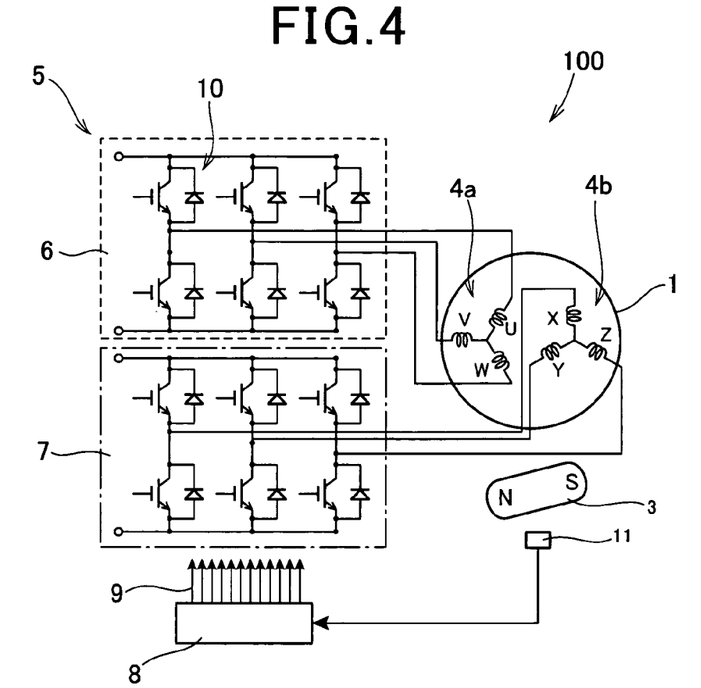
FIG. 4 is a schematic view illustrating a mechanical power generating system which includes the electric rotating machine according to the first embodiment.

FIG. 4 shows a mechanical power generating system 100 in which the electric rotating machine 1 according to the present embodiment is employed.

As shown in FIG. 4, the mechanical power generating system 100 further includes, in addition to the electric rotating machine 1, a driver 5, a controller 8, and an angular position sensor 11.

The driver 5 includes a first inverter 6 for driving the first three-phase stator coil 4a of the electric rotating machine 1 and a second inverter 7 for driving the second three-phase stator coil 4b. The first and second inverters 6 and 7 are of a well-known type; accordingly the description of their configuration is omitted hereinafter. The first and second inverters 6 and 7 drive the first and second stator coils 4a and 4b using a well-known sine-wave PWM driving method.

More specifically, each of the first and second inverters 6 and 7 is configured with six power transistors 10. The power transistors 10 of the first inverter 6 are respectively driven by six drive signals 9 sent from the controller 8, thereby supplying three first drive currents respectively to the U-phase, V-phase, and W-phase windings of the first stator coil 4a. Similarly, the power transistors 10 of the second inverters 7 are also respectively driven by six drive signals 9 sent from the controller 8, thereby supplying three second drive currents respectively to the X-phase, Y-phase, and W-phase windings of the second stator coil 4b.

The angular position sensor 11 is configured with, for example, a resolver and mounted to the rotor 3 of the electric rotating machine 1. The angular position sensor 11 senses the angular position of the rotor 3 and outputs to the controller 8 an angular position signal that indicates the sensed angular potion. The controller 8 generates, based on the angular position signal, the twelve drive signals 9 and sends them to the respective power transistors 10 of the first and second inverters 6 and 7. In addition, it is also possible for the controller 8 to feedback-control the first and second inverters 6 and 7 based on currents actually supplied to the first and second stator coils 4a and 4b which are sensed by a current sensor (not shown).

Figure 5:
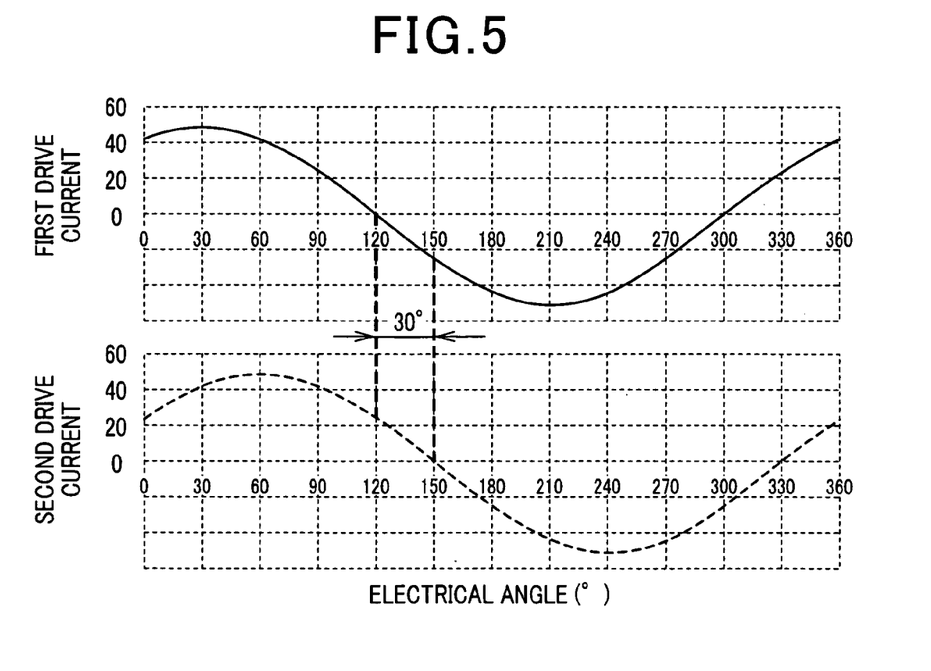
FIG. 5 is a waveform chart illustrating the waveforms of drive currents for driving the electric rotating machine according to the first embodiment.

FIG. 5 illustrates a corresponding pair of one of the first drive currents and one of the second drive currents, which are respectively supplied to a corresponding pair of one of the U-phase, V-phase, and W-phase windings of the first stator coil 4a and one of the X-phase, Y-phase, and W-phase windings of the second stator coil 4b.

It can be seen from FIG. 5 that in the present embodiment, there is a phase difference of 30° (i.e., $\pi/6$) between the corresponding pair of the first and second drive currents which are respectively supplied to the corresponding pair of the phase windings of the first and second stator coils 4a and 4b.

According to the present embodiment, it is possible to achieve the following advantages.

In general, in a three-phase electric rotating machine, magnetic noise and torque ripple are caused by the overlapping of harmonic components with sine-wave drive currents supplied to the phase windings of a three-phase stator coil of the machine; the harmonic components are caused by a dead time provided for protecting a power transistor of an inverter that drives the three-phase stator coil. More specifically, the magnetic noise and torque ripple are mainly caused by the sixth-order harmonic components of the sine-wave drive currents. In addition, the wavelength of the sixth-order harmonic components is equal to $\pi/3$.

However, in the present embodiment, the first and second three-phase stator coils 4a and 4b are offset in the circumferential direction of the stator core to have a phase difference of $\pi/6$ therebetween. Since the phase difference of $\pi/6$ is equal to half the wavelength (i.e., $\pi/3$) of the sixth-order harmonic components, the magnetic noise and torque ripple caused by the sixth-order harmonic components of the first drive currents supplied to the phase windings of the first stator coil 4a can be offset by those caused by the same of the second drive currents supplied to the phase windings of the second stator coil 4b. Consequently, the total magnetic noise and torque ripple generated in the rotating electric machine 1 can be reduced.

Figure 6:
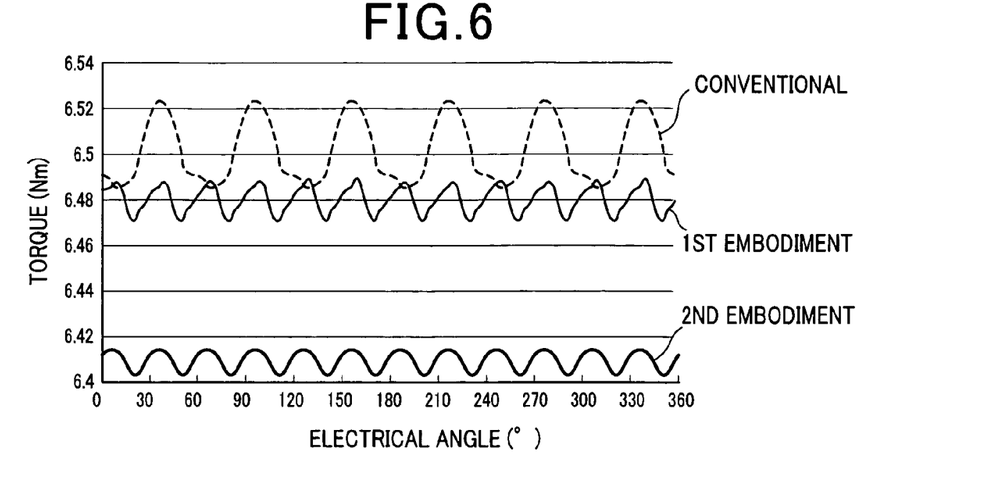
FIG. 6 is a waveform chart illustrating both the advantages of the electric rotating machine according to the first embodiment and an electric rotating machine according to the second embodiment of the invention over a conventional electric rotating machine.

FIG. 6 illustrates the advantage in torque ripple reduction of the electric rotating machine 1 according to the present embodiment over the conventional three-phase electric rotating machine described previously. More specifically, in FIG. 6, the waveform of the torque generated by the conventional three-phase electric rotating machine is shown with a dashed line, while the waveform of the torque generated the electric rotating machine 1 according to the present embodiment is shown with a thin solid line. It can be seen from FIG. 6 that the torque ripple generated in the electric rotating machine 1 is reduced by about 50% in comparison with that generated in the conventional three-phase electric rotating machine.

Further, in the present embodiment, with respect to the pitch of the magnetic poles 3a in electrical angle being equal to $\pi$, the pitch of the stator core teeth 2a in electrical angle is equal to $(1-1/6)\pi$. Moreover, the winding directions of each corresponding pair of one of the U-phase, V-phase, and W-phase windings of the first stator coil 4a and one of the X-phase, Y-phase, and Z-phase windings of the second stator coil 4b, which are respectively wound around an adjacent pair of the stator core teeth 2a, are opposite to each other.

With the above configuration, the phase difference between each corresponding pair of the phase windings of the first and second stator coils 4a and 4b becomes equal to: $(1-1/6)\pi-\pi=-\pi/$. Consequently, it becomes possible to easily realize the phase difference of $\pi/6$ between the first and second stator coils 4a and 4b.

In the present embodiment, the number of the stator core teeth 2a is equal to 12, while the number of the magnetic poles 3a is equal to 10. That is, the ratio of the number of the stator core teeth 2a to the number of the magnetic poles 3a is equal to 6:5.

By setting the ratio of the number of the stator core teeth 2a to the number of the magnetic poles 3a as above, it becomes possible to make the pitch of the stator core teeth 2a in electrical angle equal to $(1-1/6)\pi$ and thereby realize the phase difference of $\pi/6$ between the first and second stator coils 4a and 4b.

In comparison, in widely-used concentrated winding electric rotating machines which have 8 magnetic poles with respect to 12 stator core teeth or 6 magnetic poles with respect to 9 stator core teeth, it is difficult to realize the phase difference of π/6 between the first and second stator coils.

In the present embodiment, the U-phase, V-phase, and W-phase windings of the first stator coil 4a are wound around the odd-numbered stator core teeth 2a, whereas the X-phase, Y-phase, and Z-phase windings of the second stator coil 4b are wound around the even-numbered stator core teeth 2a.

With the above configuration, the U-phase, V-phase, and W-phase windings of the first stator coil 4a are alternately assigned to the stator core teeth 2a with the X-phase, Y-phase, and Z-phase windings of the second stator coil 4b, thereby making it possible to realize the phase difference of π/6 between the first and second stator coils 4a and 4b.

In the present embodiment, the electric rotating machine 1 is driven by the driver 5 that includes the first and second inverters 6 and 7. The first inverter 6 drives the first stator coil 4a by supplying the first sine-wave drive currents respectively to the U-phase, V-phase, and W-phase windings of the first stator coil 4a. The second inverter 7 drives the second stator coil 4b by supplying the second sine-wave drive currents respectively to the X-phase, Y-phase, and W-phase windings of the second stator coil 4b. Further, there is provided the phase difference of π/6 between each corresponding pair of the first and second drive currents which are respectively supplied to a corresponding pair of one of the phase windings of the first stator coil 4a and one of the phase windings of the second stator coil 4b.

With the above configuration, it is possible to make the phase difference between the corresponding pairs of the first and second drive currents coincident with that between the corresponding pairs of the phase windings of the first and second stator coils 4a and 4b, thereby reliably reducing the magnetic noise and torque ripple generated in the electric rotating machine 1.

[Second Embodiment]

Figure 7:
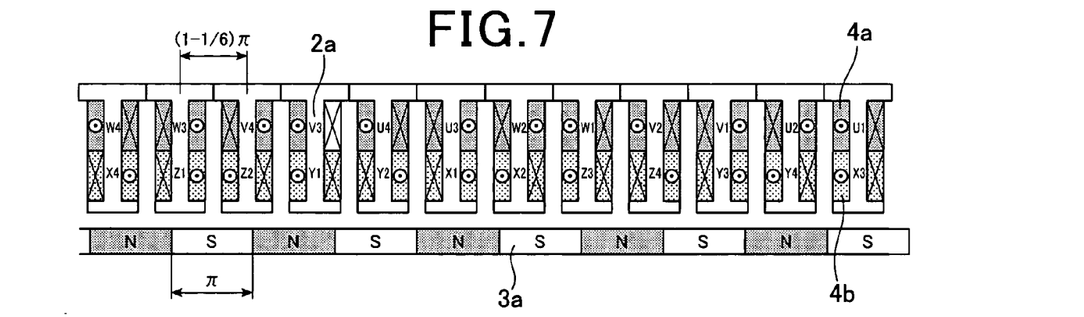
FIG. 7 is a development of an axial cross section of the electric rotating machine according to the second embodiment.
Figure 8:
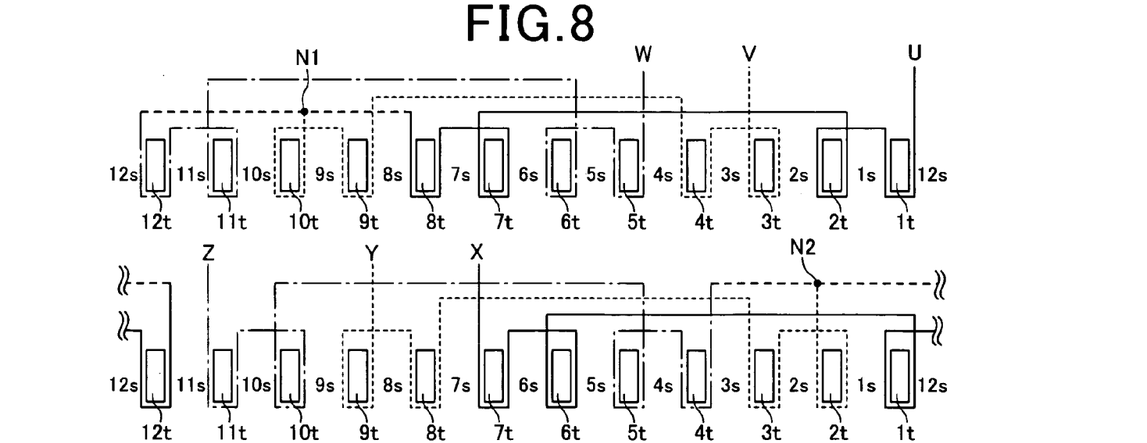
FIG. 8 is a schematic circuit diagram of the electric rotating machine according to the second embodiment.

FIGS. 7 and 8 illustrate the configuration of an electric rotating machine 1 according to the second embodiment of the invention. It should be noted that for the sake of facilitating understanding, first and second three-phase stator coils 4a and 4b of the electric rotating machine 1, which are actually mounted on the same stator core, are separately shown in FIG. 8.

As shown in FIGS. 7 and 8, the stator core of the stator 2 and the rotor 3 in this embodiment are identical to those in the first embodiment. Accordingly, in this embodiment, the number of the stator core teeth 2a is equal to twelve; the number of the magnetic poles 3a is equal to ten; with respect to the pitch of the magnetic poles 3a in electrical angle being equal to π, the pitch of the stator core teeth 2a in electrical angle is equal to (1−1/6)π.

However, the first and second three-phase stator coils 4a and 4b are wound on the stator core in a different manner from those in the first embodiment.

Specifically, in the present embodiment, the first three-phase stator coil 4a is wound in a concentrated winding manner so that each of the U-phase, V-phase, and W-phase windings is wound around a radially outer part of each of corresponding four of the stator core teeth 2a of the stator core by a predetermined number of turns.

The U-phase winding of the first stator coil 4a includes first, second, third, and fourth sections U1-U4. The first section U1 is wound, from the slot 12s to the slot 1s, clockwise around the radially outer part of the stator core tooth it by the predetermined number of turns. The second section U2 is wound, from the slot 2s to the slot 1s, counterclockwise around the radially outer part of the stator core tooth 2t by the predetermined number of turns. The third section U3 is wound, from the slot 7s to the slot 6s, counterclockwise around the radially outer part of the stator core tooth 7t by the predetermined number of turns. The fourth section U4 is wound, from the slot 7s to the slot 8s, clockwise around the radially outer part of the stator core tooth 8t by the predetermined number of turns. Further, the first, second, third, and fourth sections U1-U4 of the U-phase winding are connected in series with one another. More specifically, one end of the first section U1 which protrudes from the slot 12s makes up a U-terminal of the first stator coil 4a; the other end of the first section U1 which protrudes from the slot 1s is connected to one end of the second section U2 which protrudes from the slot 2s; the other end of the second section U2 which protrudes from the slot 1s is connected to one end of the third section U3 which protrudes from the slot 7s; the other end of the third section U3 which protrudes from the slot 6s is connected to one end of the fourth section U4 which protrudes from the slot 7s; and the other end of the fourth section U4 which protrudes from the slot 8s is connected to a neutral point N1 of the first stator coil 4a.

The V-phase winding of the first stator coil 4a includes first, second, third, and fourth sections V1-V4. The first section V1 is wound, from the slot 3s to the slot 2s, counterclockwise around the radially outer part of the stator core tooth 3t by the predetermined number of turns. The second section V2 is wound, from the slot 3s to the slot 4s, clockwise around the radially outer part of the stator core tooth 4t by the predetermined number of turns. The third section V3 is wound, from the slot 8s to the slot 9s, clockwise around the radially outer part of the stator core tooth 9t by the predetermined number of turns. The fourth section V4 is wound, from the slot 10s to the slot 9s, counterclockwise around the radially outer part of the stator core tooth lot by the predetermined number of turns. Further, the first, second, third, and fourth sections V1-V4 of the V-phase winding are connected in series with one another. More specifically, one end of the first section V1 which protrudes from the slot 3s makes up a V-terminal of the first stator coil 4a; the other end of the first section V1 which protrudes from the slot 2s is connected to one end of the second section V2 which protrudes from the slot 3s; the other end of the second section V2 which protrudes from the slot 4s is connected to one end of the third section V3 which protrudes from the slot 8s; the other end of the third section V3 which protrudes from the slot 9s is connected to one end of the fourth section V4 which protrudes from the slot 10s; and the other end of the fourth section V4 which protrudes from the slot 9s is connected to the neutral point N1 of the first stator coil 4a.

The W-phase winding of the first stator coil 4a includes first, second, third, and fourth sections W1-W4. The first section W1 is wound, from the slot 4s to the slot 5s, clockwise around the radially outer part of the stator core tooth 5t by the predetermined number of turns. The second section W2 is wound, from the slot 6s to the slot 5s, counterclockwise around the radially outer part of the stator core tooth 6t by the predetermined number of turns. The third section W3 is wound, from the slot 11s to the slot 10s, counterclockwise around the radially outer part of the stator core tooth 11t by the predetermined number of turns. The fourth section W4 is wound, from the slot 11s to the slot 12s, clockwise around the radially outer part of the stator core tooth 12t by the predetermined number of turns. Further, the first, second, third, and fourth sections W1-W4 of the W-phase winding are connected in series with one another. More specifically, one end of the first section W1 which protrudes from the slot 4s makes up a W-terminal of the first stator coil 4a; the other end of the first section W1 which protrudes from the slot 5s is connected to one end of the second section W2 which protrudes from the slot 6s; the other end of the second section W2 which protrudes from the slot 5s is connected to one end of the third section W3 which protrudes from the slot 11s; the other end of the third section W4 which protrudes from the slot 10s is connected to one end of the fourth section which protrudes from the slot 11s; and the other end of the fourth section W4 which protrudes from the slot 12s is connected to the neutral point N1 of the first stator coil 4a.

The second three-phase stator coil 4b is also wound in the concentrated winding manner so that each of the X-phase, Y-phase, and Z-phase windings is wound around a radially inner part of each of corresponding four of the stator core teeth 2a of the stator core by the predetermined number of turns.

The X-phase winding of the second stator coil 4b includes first, second, third, and fourth sections X1-X4. The first section X1 is wound, from the slot 7s to the slot 6s, counterclockwise around the radially inner part of the stator core tooth 7t by the predetermined number of turns. The second section X2 is wound, from the slot 5s to the slot 6s, clockwise around the radially inner part of the stator core tooth 6t by the predetermined number of turns. The third section X3 is wound, from the slot 12s to the slot 1s, clockwise around the radially inner part of the stator core tooth 1t by the predetermined number of turns. The fourth section X4 is wound, from the slot 12s to the slot 11s, counterclockwise around the radially inner part of the stator core tooth 12t by the predetermined number of turns. Further, the first, second, third, and fourth sections X1-X4 of the X-phase winding are connected in series with one another. More specifically, one end of the first section X1 which protrudes from the slot 7s makes up a X terminal of the second stator coil 4b; the other end of the first section X1 which protrudes from the slot 6s is connected to one end of the second section X2 which protrudes from the slot 5s; the other end of the second section X2 which protrudes from the slot 6s is connected to one end of the third section X3 which protrudes from the slot 12s; the other end of the third section X3 which protrudes from the slot 1s is connected to one end of the fourth section X4 which protrudes from the slot 12s; and the other end of the fourth section X4 which protrudes from the slot 11s is connected to a neutral point N2 of the second stator coil 4b.

The Y-phase winding of the second stator coil 4b includes first, second, third, and fourth sections Y1-Y4. The first section Y1 is wound, from the slot 8s to the slot 9s, clockwise around the radially inner part of the stator core tooth 9t by the predetermined number of turns. The second section Y2 is wound, from the slot 8s to the slot 7s, counterclockwise around the radially inner part of the stator core tooth 8t by the predetermined number of turns. The third section Y3 is wound, from the slot 3s to the slot 2s, counterclockwise around the radially inner part of the stator core tooth 3t by the predetermined number of turns. The fourth section Y4 is wound, from the slot 1s to the slot 2s, clockwise around the radially inner part of the stator core tooth 2t by the predetermined number of turns. Further, the first, second, third, and fourth sections Y1-Y4 of the Y-phase winding are connected in series with one another. More specifically, one end of the first section Y1 which protrudes from the slot 8s makes up a Y terminal of the second stator coil 4b; the other end of the first section Y1 which protrudes from the slot 9s is connected to one end of the second section Y2 which protrudes from the slot 8s; the other end of the second section Y2 which protrudes from the slot 7s is connected to one end of the third section Y3 which protrudes from the slot 3s; the other end of the third section Y3 which protrudes from the slot 2s is connected to one end of the fourth section Y4 which protrudes from the slot 1s; and the other end of the fourth section Y4 which protrudes from the slot 2s is connected to the neutral point N2 of the second stator coil 4b.

The Z-phase winding of the second stator coil 4b includes first, second, third, and fourth sections Z1-Z4. The first section Z1 is wound, from the slot 11s to the slot 10s, counterclockwise around the radially inner part of the stator core tooth 11t by the predetermined number of turns. The second section Z2 is wound, from the slot 9s to the slot 10s, clockwise around the radially inner part of the stator core tooth 10t by the predetermined number of turns. The third section Z3 is wound, from the slot 4s to the slot 5s, clockwise around the radially inner part of the stator core tooth 5t by the predetermined number of turns. The fourth section Z4 is wound, from the slot 4s to the slot 3s, counterclockwise around the radially inner part of the stator core tooth 4t by the predetermined number of turns. Further, the first, second, third, and fourth sections Z1-Z4 of the Z-phase winding are connected in series with one another. More specifically, one end of the first section Z1 which protrudes from the slot 1 is makes up a Z terminal of the second stator coil 4b; the other end of the first section Z1 which protrudes from the slot 10s is connected to one end of the second section Z2 which protrudes from the slot 9s; the other end of the second section Z2 which protrudes from the slot 10s is connected to one end of the third section Z3 which protrudes from the slot 4s; the other end of the third section Z3 which protrudes from the slot 5s is connected to one end of the fourth section Z4 which protrudes from the slot 4s; and the other end of the fourth section Z4 which protrudes from the slot 3s is connected to the neutral point N2 of the second stator coil 4b.

As above, in the present embodiment, the U-phase, V-phase, and W-phase windings of the first stator coil 4a are wound around the radially outer parts of the stator core teeth 2a, whereas the X-phase, Y-phase, and Z-phase windings of the second stator coil 4b are wound around the radially inner parts of the stator core teeth 2a. Moreover, each of the U-phase, V-phase, and W-phase windings of the first stator coil 4a is offset in the circumferential direction of the stator core by one stator core tooth 2a (i.e., by $(1-1/6)\pi$ in electrical angle) from a corresponding one of the X, Y, and Z phase-windings of the second stator coil 4b. Further, the winding directions of each corresponding pair of one of the U-phase, V-phase, and W-phase windings of the first stator coil 4a and one of the X-phase, Y-phase, and Z-phase windings of the second stator coil 4b, which are respectively wound around an adjacent pair of the stator core teeth 2a, are opposite to each other. Consequently, the phase difference between each corresponding pair of the phase windings of the first and second stator coils 4a and 4b, such as the pair of U-phase and X-phase windings, the pair of V-phase and Y-phase windings, and the pair of W-phase and Z-phase windings, becomes equal to: $(1-1/6)\pi-\pi=-\pi/6$. As a result, the first and second three-phase stator coils 4a and 4b are offset from each other in the circumferential direction of the stator core to have a phase difference of $\pi/6$ therebetween. In other words, the first and second three-phase stator coils 4a and 4b are offset by an electrical angle of $\pi/6$.

With the above configuration of the electric rotating machine 1 according to the present embodiment, it is possible to achieve the same advantages as with the configuration according to the first embodiment.

Further, according to the present embodiment, each of the phase windings of the first and second stator coils 4a and 4b is comprised of the four sections that are respectively wound around the four different stator core teeth 2a and connected in series with each other. Consequently, the magnetic noise and torque ripple caused by the sixth-order harmonic components of the first drive currents supplied to the phase windings of the first stator coil 4a can be more effectively offset by those caused by the same of the second drive currents supplied to the phase windings of the second stator coil 4b. As a result, as shown in 6, the torque ripple generated in the electric rotating machine 1 according to the present embodiment is reduced by about 65% in comparison with that generated in the conventional three-phase electric rotating machine.

In addition, the electric rotating machine 1 according to the present embodiment can be driven by the same driver 5 and in the same manner as that according to the first embodiment. Therefore, a repeated description of the driving method and its advantages is omitted here.

[Third Embodiment]

Figures 9, 10:
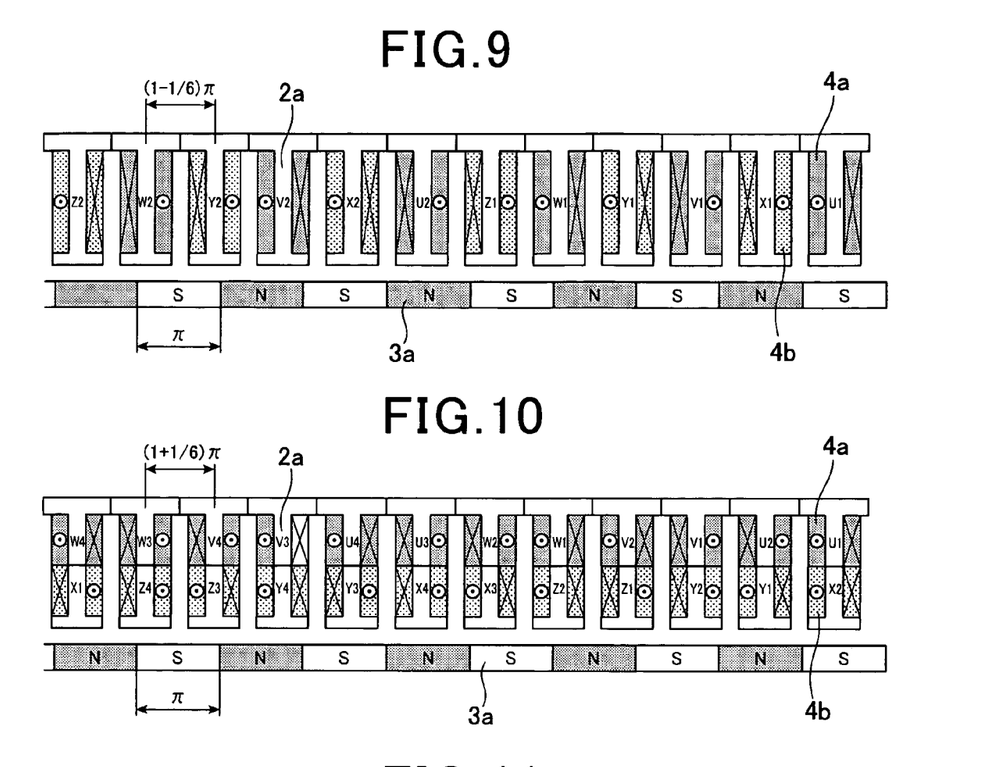
FIG. 9 is a development of an axial cross section of an electric rotating machine according to the third embodiment of the invention.
FIG. 10 is a development of an axial cross section of an electric rotating machine according to the fourth embodiment of the invention.

FIG. 9 illustrates the configuration of an electric rotating machine 1 according to the third embodiment of the invention.

As shown in FIG. 9, the stator 2 in this embodiment is identical to that in the first embodiment. However, the rotor 3 in this embodiment has a different number of magnetic poles 3a from that in the first embodiment. Specifically, in the present embodiment, the rotor 3 has formed therein seven N poles and seven S poles that are alternately arranged in the circumferential direction of the stator core.

Accordingly, in the present embodiment, with respect to the number of the stator core teeth 2a being equal to twelve, the number of the magnetic poles 3a is equal to fourteen. That is, the ratio of the number of the stator core teeth 2a to the number of the magnetic poles 3a is equal to 6:7. Therefore, with respect to the pitch of the magnetic poles 3a in electrical angle being equal to $\pi$, the pitch of the stator core teeth 2a in electrical angle is equal to $(1+1/6)\pi$.

Further, in the present embodiment, the first and second three-phase stator coils 4a and 4b are wound in the same manner as in the first embodiment. More specifically, in the present embodiment, the U-phase, V-phase, and W-phase windings of the first stator coil 4a are wound around the odd-numbered stator core teeth 2a, whereas the X-phase, Y-phase, and Z-phase windings of the second stator coil 4b are wound around the even-numbered stator core teeth 2a. That is, the U-phase, V-phase, and W-phase windings of the first stator coil 4a are alternately assigned to the stator core teeth 2a with the X-phase, Y-phase, and Z-phase windings of the second stator coil 4b. Moreover, the winding directions of each corresponding pair of one of the U-phase, V-phase, and W-phase windings of the first stator coil 4a and one of the X-phase, Y-phase, and Z-phase windings of the second stator coil 4b, which are respectively wound around an adjacent pair of the stator core teeth 2a, are opposite to each other. Consequently, the phase difference between each corresponding pair of the phase windings of the first and second stator coils 4a and 4b, such as the pair of U-phase and X-phase windings, the pair of V-phase and Y-phase windings, and the pair of W-phase and Z-phase windings, becomes equal to: $(1+1/6)\pi-\pi=\pi/6$. As a result, the first and second three-phase stator coils 4a and 4b are offset from each other in the circumferential direction of the stator core to have a phase difference of $\pi/6$ therebetween. In other words, the first and second three-phase stator coils 4a and 4b are offset by an electrical angle of $\pi/6$.

With the above configuration of the electric rotating machine 1 according to the present embodiment, it is also possible to achieve the same advantages as with the configuration according to the first embodiment.

In addition, the electric rotating machine 1 according to the present embodiment can be driven by the same driver 5 and in the same manner as that according to the first embodiment. Therefore, a repeated description of the driving method and its advantages is omitted here.

[Fourth Embodiment]

FIG. 10 illustrates the configuration of an electric rotating machine 1 according to the fourth embodiment of the invention.

As shown in FIG. 10, the stator 2 in this embodiment is identical to that in the second embodiment. However, the rotor 3 in this embodiment has a different number of magnetic poles 3a from that in the second embodiment. Specifically, in the present embodiment, the rotor 3 has formed therein seven N poles and seven S poles that are alternately arranged in the circumferential direction of the rotor 3.

Accordingly, in the present embodiment, with respect to the number of the stator core teeth 2a being equal to twelve, the number of the magnetic poles 3a is equal to fourteen. That is, the ratio of the number of the stator core teeth 2a to the number of the magnetic poles 3a is equal to 6:7. Therefore, with respect to the pitch of the magnetic poles 3a in electrical angle being equal to $\pi$, the pitch of the stator core teeth 2a in electrical angle is equal to $(1+1/6)\pi$.

Further, in the present embodiment, the first and second three-phase stator coils 4a and 4b are wound in the same manner as in the second embodiment. More specifically, the U-phase, V-phase, and W-phase windings of the first stator coil 4a are wound around the radially outer parts of the stator core teeth 2a, whereas the X-phase, Y-phase, and Z-phase windings of the second stator coil 4b are wound around the radially inner parts of the stator core teeth 2a. Moreover, each of the U-phase, V-phase, and W-phase windings of the first stator coil 4a is offset in the circumferential direction of the stator core by one stator core tooth 2a (i.e., by $(1+1/6)\pi$ in electrical angle) from a corresponding one of the X, Y, and Z phase-windings of the second stator coil 4b. Further, the winding directions of each corresponding pair of one of the U-phase, V-phase, and W-phase windings of the first stator coil 4a and one of the X-phase, Y-phase, and Z-phase windings of the second stator coil 4b, which are respectively wound around an adjacent pair of the stator core teeth 2a, are opposite to each other. Consequently, the phase difference between each corresponding pair of the phase windings of the first and second stator coils 4a and 4b, such as the pair of U-phase and X-phase windings, the pair of V-phase and Y-phase windings, and the pair of W-phase and Z-phase windings, becomes equal to: $(1+1/6)\pi-\pi=\pi/6$. As a result, the first and second three-phase stator coils 4a and 4b are offset from each other in the circumferential direction of the stator core to have a phase difference of $\pi/6$ therebetween. In other words, the first and second three-phase stator coils 4a and 4b are offset by an electrical angle of $\pi/6$.

With the above configuration of the electric rotating machine 1 according to the present embodiment, it is possible to achieve the same advantages as with the configuration according to the second embodiment.

In addition, the electric rotating machine 1 according to the present embodiment can be driven by the same driver 5 and in the same manner as that according to the first embodiment. Therefore, a repeated description of the driving method and its advantages is omitted here.

While the above particular embodiments of the present invention have been shown and described, it will be understood by those skilled in the art that various modifications, changes, and improvements may be made without departing from the spirit of the invention.

For example, in the previous embodiments, the magnetic poles 3a of the rotor 3 are formed by arranging the permanent magnets on the radially outer periphery of the rotor 3.

Figure 11:
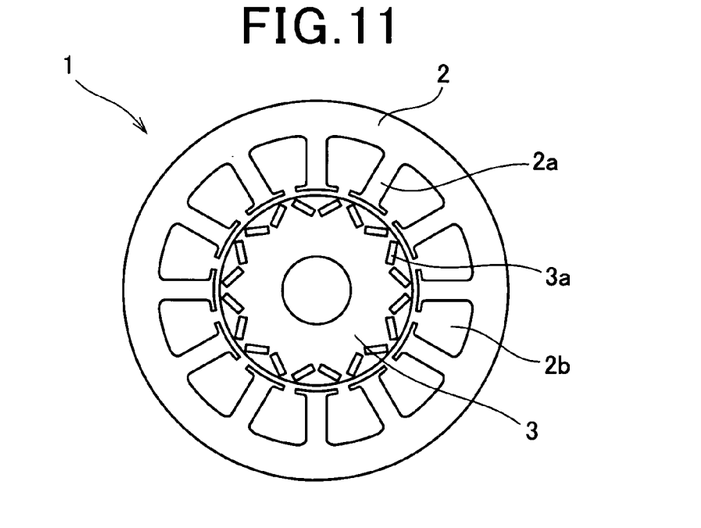
FIG. 11 is a schematic view illustrating an electric rotating machine according to a modification of the invention.

However, as shown in FIG. 11, the magnetic poles 3a of the rotor 3 may also be formed by embedding the permanent magnets in the rotor 3. In other words, the rotor 3 may also be of an IPM (Interior Permanent Magnet) type. In this case, it is possible to further reduce the magnetic noise and torque ripple generated in the electric rotating machine 1.

Moreover, the magnetic poles 3a of the rotor 3 may also be formed by creating desired magnetic reluctance in the rotor 3 or by using electromagnets. In other words, the rotor 3 may also be of a reluctance type or an electromagnet type.

In the previous embodiments, both the first and second three-phase stator coils 4a and 4b are formed by Y-connecting the is respective phase windings. However, either or both of the first and second three-phase stator coils 4a and 4b may also be formed by Δ-connecting the respective phase windings.

In the previous embodiments, the number of the stator core teeth 2a is equal to twelve, while the number of the magnetic poles 3a is equal to 10 or 14. In other words, the number of the stator core teeth 2a is equal to 12×1 with the number of the magnetic poles 3a being equal to 10×1 or 14×1. However, the number of the stator core teeth 2a may also be equal to 12×n with the number of the magnetic poles 3a being equal to 10×n or 14×n, where n is a natural number greater than 1.

In the first and third embodiments, for each of the phase windings of the first and second three-phase stator coils 4a and 4b, the two sections of the phase winding is connected in series with each other.

However, the two sections may also be connected in parallel with each other. In addition, in this case, it is preferable to halve the cross-sectional area of the phase winding and double the number of turns of the same around the corresponding stator core teeth 2a.

In the second and fourth embodiments, for each of the phase windings of the first and second three-phase stator coils 4a and 4b, the four sections of the phase winding is connected in series with each other. However, the four sections may also be connected in parallel with each other. In addition, in this case, it is preferable to halve the cross-sectional area of the phase winding is and double the number of turns of the same around the corresponding stator core teeth 2a.

What is claimed is:

1. An electric rotating machine comprising:
a stator including a hollow cylindrical stator core and first and second three-phase stator coils, the stator core having a plurality of stator core teeth that are formed at a predetermined pitch in a circumferential direction of the stator core, each of the first and second three-phase stator coils being comprised of three phase windings, the first and second three-phase stator coils being wound on the stator core in a concentrated winding manner so that each of the phase windings of the first and second three-phase stator coils is wound around each of a predetermined number of the stator core teeth by a predetermined number of turns; and
a rotor disposed radially inside of the stator core, the rotor having a plurality of magnetic poles which are so formed that the polarities of the magnetic poles alternate between north and south in the circumferential direction of the stator core, wherein:
the first and second three-phase stator coils are offset in the circumferential direction of the stator core to have a phase difference of $\pi/6$ therebetween;
with respect to the pitch of the magnetic poles in electrical angle being equal to $\pi$, the predetermined pitch of the stator core teeth in electrical angle is equal to $(1\pm1/6)\pi$;
the winding directions of each corresponding pair of one of the phase windings of the first three-phase stator coil and one of the phase windings of the second three-phase stator coil, which are respectively wound around an adjacent pair of the stator core teeth, are opposite to each other;
the number of the stator core teeth is equal to 12×n, where n is a natural number;
the ratio of the number of the stator core teeth to the number of the magnetic poles is equal to 6:5 or 6:7;
the three phase windings of the first three-phase stator coil include a U-phase winding, a W-phase winding, and a V-phase winding;
the three phase windings of the second three-phase stator coil include an X-phase winding, a Y-phase winding, and a Z-phase winding;
the U-phase winding includes first and second sections that are wound respectively around the (12×(n−1)+1)th and (12×(n−1)+7)th stator core teeth and connected in series or parallel with each other;
the V-phase winding includes first and second sections that are wound respectively around the (12×(n−1)+3)th and (12×(n−1)+9)th stator core teeth and connected in series or parallel with each other;
the W-phase winding includes first and second sections that are wound respectively around the (12×(n−1)+5)th and (12×(n−1)+11)th stator core teeth and connected in series or parallel with each other;
the X-phase winding includes first and second sections that are wound respectively around the (12×(n−1)+2)th and (12×(n−1)+8)th stator core teeth and connected in series or parallel with each other;
the Y-phase winding includes first and second sections that are wound respectively around the (12×(n−1)+4)th and (12×(n−1)+10)th stator core teeth and connected in series or parallel with each other; and
the Z-phase winding includes first and second sections that are wound respectively around the (12×(n−1)+6)th and (12×(n−1)+12)th stator core teeth and connected in series or parallel with each other.

2. The electric rotating machine as set forth in claim 1, wherein the electric rotating machine is used in a mechanical power generating system which further comprises:
a first inverter that drives the first three-phase stator coil by supplying first drive currents to the phase windings of the first three-phase stator coil; and
a second inverter that drives the second three-phase stator coil by supplying second drive currents to the phase windings of the second three-phase stator coil,
wherein
there is provided a phase difference of $\pi/6$ between each corresponding pair of one of the first drive currents and one of the second drive currents which are respectively supplied to a corresponding pair of one of the phase windings of the first three-phase stator coil and one of the phase windings of the second three-phase stator coil.

3. A driving apparatus for driving the electric rotating machine as set forth in claim 1, the driving apparatus comprising:

a first inverter that drives the first three-phase stator coil by supplying first drive currents to the phase windings of the first three-phase stator coil; and a second inverter that drives the second three-phase stator coil by supplying second drive currents to the phase windings of the second three-phase stator coil, wherein there is provided a phase difference of $\pi/6$ between each corresponding pair of one of the first drive currents and one of the second drive currents which are respectively supplied to a corresponding pair of one of the phase windings of the first three-phase stator coil and one of the phase windings of the second three-phase stator coil.

4. An electric rotating machine comprising:

a stator including a hollow cylindrical stator core and first and second three-phase stator coils, the stator core having a plurality of stator core teeth that are formed at a predetermined pitch in a circumferential direction of the stator core, each of the first and second three-phase stator coils being comprised of three phase windings, the first and second three-phase stator coils being wound on the stator core in a concentrated winding manner so that each of the phase windings of the first and second three-phase stator coils is wound around each of a predetermined number of the stator core teeth by a predetermined number of turns; and a rotor disposed radially inside of the stator core, the rotor having a plurality of magnetic poles which are so formed that the polarities of the magnetic poles alternate between north and south in the circumferential direction of the stator core, wherein:

the first and second three-phase stator coils are offset in the circumferential direction of the stator core to have a phase difference of $\pi/6$ therebetween;

with respect to the pitch of the magnetic poles in electrical angle being equal to $\pi$, the predetermined pitch of the stator core teeth in electrical angle is equal to $(1\pm1/6)\pi$;

the winding directions of each corresponding pair of one of the phase windings of the first three-phase stator coil and one of the phase windings of the second three-phase stator coil, which are respectively wound around an adjacent pair of the stator core teeth, are opposite to each other;

the number of the stator core teeth is equal to $12\times n$, where n is a natural number;

the ratio of the number of the stator core teeth to the number of the magnetic poles is equal to 6:5 or 6:7;

the three phase windings of the first three-phase stator coil include a U-phase winding, a W-phase winding, and a V-phase winding;

the three phase windings of the second three-phase stator coil include an X-phase winding, a Y-phase winding, and a Z-phase winding;

the U-phase winding includes first, second, third, and fourth sections that are wound respectively around the $(12\times(n-1)+1)$th, $(12\times(n-1)+2)$th, $(12\times(n-1)+7)$th, and $(12\times(n-1)+8)$th stator core teeth and connected in series or parallel with each other;

the V-phase winding includes first, second, third, and fourth sections that are wound respectively around the $(12\times(n-1)+3)$th, $(12\times(n-1)+4)$th, $(12\times(n-1)+9)$th, and $(12\times(n-1)+10)$th stator core teeth and connected in series or parallel with each other;

the W-phase winding includes first, second, third, and fourth sections that are wound respectively around the $(12\times(n-1)+5)$th, $(12\times(n-1)+6)$th, $(12\times(n-1)+11)$th, and $(12\times(n-1)+12)$th stator core teeth and connected in series or parallel with each other;

the X-phase winding includes first, second, third, and fourth sections that are wound respectively around the $(12\times(n-1)+7)$th, $(12\times(n-1)+6)$th, $(12\times(n-1)+1)$th, and $(12\times(n-1)+12)$th stator core teeth and connected in series or parallel with each other;

the Y-phase winding includes first, second, third, and fourth sections that are wound respectively around the $(12\times(n-1)+9)$th, $(12\times(n-1)+8)$th, $(12\times(n-1)+3)$th, and $(12\times(n-1)+2)$th stator core teeth and connected in series or parallel with each other; and the Z-phase winding includes first, second, third, and fourth sections that are wound respectively around the $(12\times(n-1)+11)$th, $(12\times(n-1)+10)$th, $(12\times(n-1)+5)$th, and $(12\times(n-1)+4)$th stator core teeth and connected in series or parallel with each other.

5. The electric rotating machine as set forth in claim 4, wherein the electric rotating machine is used in a mechanical power generating system which further comprises:

a first inverter that drives the first three-phase stator coil by supplying first drive currents to the phase windings of the first three-phase stator coil; and a second inverter that drives the second three-phase stator coil by supplying second drive currents to the phase windings of the second three-phase stator coil, wherein there is provided a phase difference of $\pi/6$ between each corresponding pair of one of the first drive currents and one of the second drive currents which are respectively supplied to a corresponding pair of one of the phase windings of the first three-phase stator coil and one of the phase windings of the second three-phase stator coil.

6. A driving apparatus for driving the electric rotating machine as set forth in claim 4, the driving apparatus comprising:

a first inverter that drives the first three-phase stator coil by supplying first drive currents to the phase windings of the first three-phase stator coil; and a second inverter that drives the second three-phase stator coil by supplying second drive currents to the phase windings of the second three-phase stator coil, wherein there is provided a phase difference of $\pi/6$ between each corresponding pair of one of the first drive currents and one of the second drive currents which are respectively supplied to a corresponding pair of one of the phase windings of the first three-phase stator coil and one of the phase windings of the second three-phase stator coil.

* * * * *